United States Patent [19]

Covey, III et al.

[11] 4,086,806
[45] May 2, 1978

[54] SEAL AND ACTUATOR FOR PIPE TESTING

[75] Inventors: George H. Covey, III; Donald D. Stenabaugh, both of Pawling, N.Y.

[73] Assignee: The Presray Corporation, Pawling, N.Y.

[21] Appl. No.: 763,311

[22] Filed: Jan. 28, 1977

[51] Int. Cl.² ............................................. G01M 3/28
[52] U.S. Cl. ........................................ 73/49.5; 277/34
[58] Field of Search ............... 73/49.5, 49.6, 46, 49.1; 277/27, 34, 34.3; 49/477, 479

[56] References Cited

U.S. PATENT DOCUMENTS

| 1,757,724 | 5/1930 | Larson | 73/49.5 X |
| 3,731,525 | 5/1973 | Suter | 73/49.5 |

FOREIGN PATENT DOCUMENTS

| 598,160 | 6/1934 | Germany | 73/49.5 |
| 116,565 | 4/1969 | Norway | 73/49.5 |

Primary Examiner—Richard C. Queisser
Assistant Examiner—Joseph W. Roskos
Attorney, Agent, or Firm—Mandeville and Schweitzer

[57] ABSTRACT

In an apparatus for pressure testing open-ended pipes or the like there is provided a novel sealing means to form an air-tight seal between the open end of a pipe to be tested and an end plate of a pipe supporting test fixture. The sealing means comprises a continuous, annular, yieldable sealing member of triangular cross-section supported on the end plate. A pneumatically expandable annular actuator is associated with the continuous sealing member. The sealing member is normally spaced radially and axially from the junction area of the pipe end and test fixture end plate. The pneumatically inflatable actuator is operative to expand the continuous yieldable sealing element radially and simultaneously to advance it longitudinally, whereby the triangular sealing member is tightly wedged into said junction area to form a preliminary seal. When test pressure is applied, it acts upon the triangular sealing member to increase the seal effectiveness.

7 Claims, 4 Drawing Figures

U.S. Patent  May 2, 1978  4,086,806
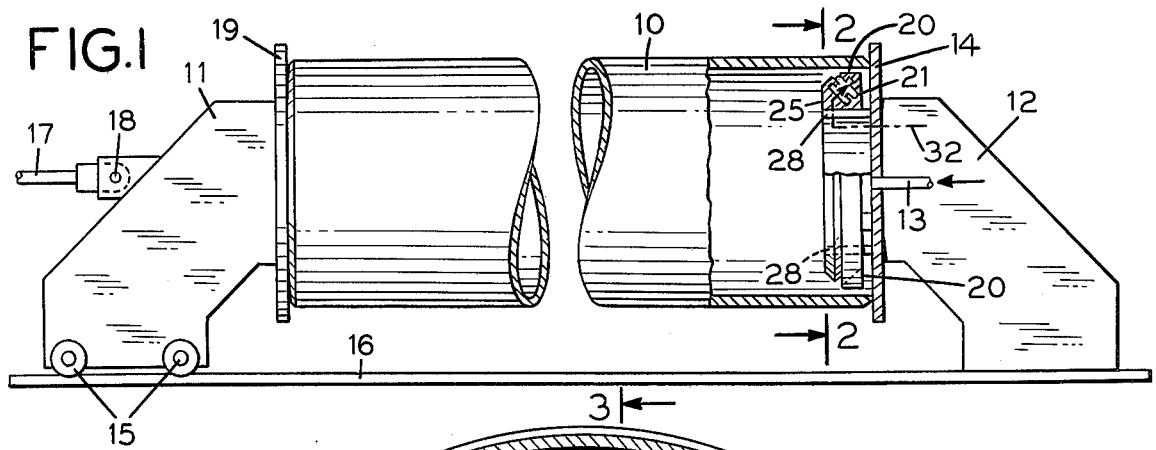
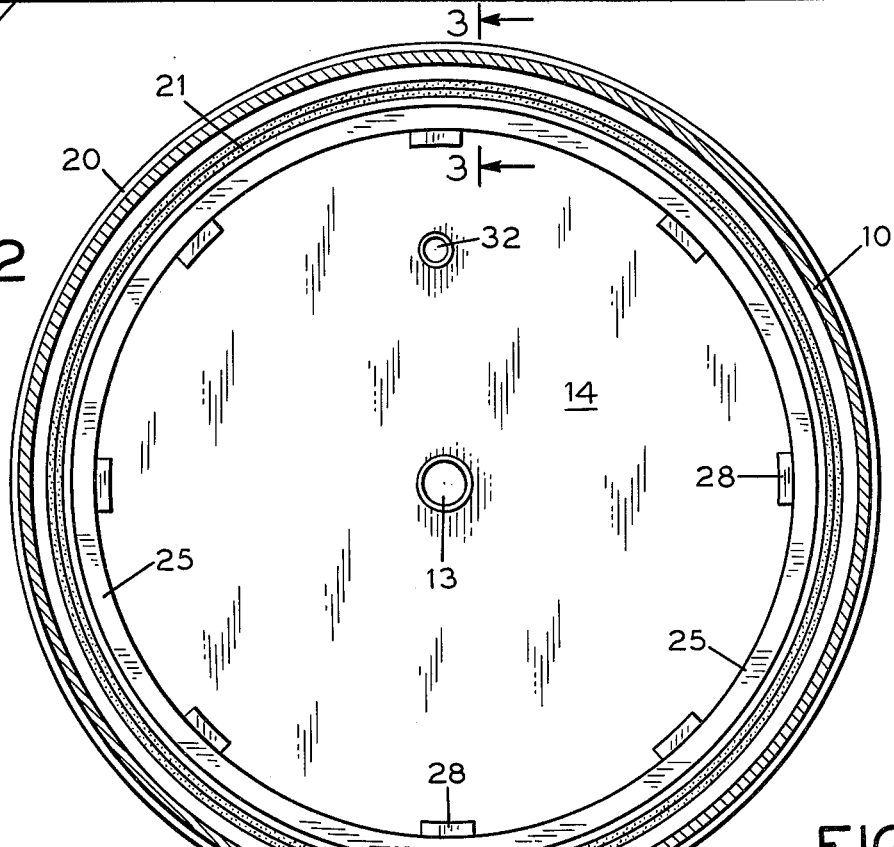
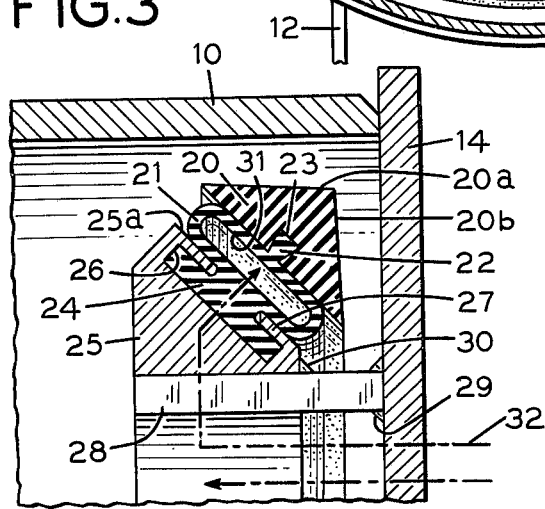
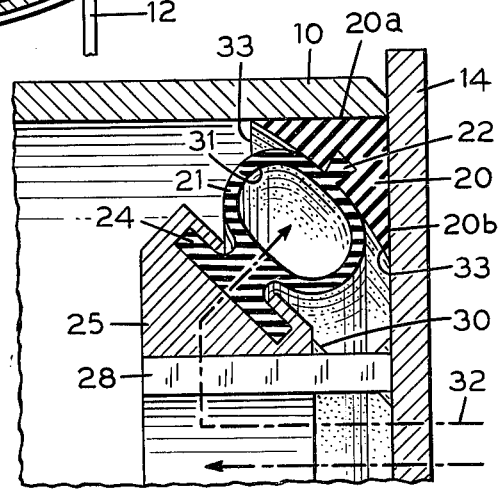

SEAL AND ACTUATOR FOR PIPE TESTING

BACKGROUND AND SUMMARY OF THE INVENTION

The present invention is related to the pressure testing of open-ended large diameter pipes. After the manufacture of a section of large diameter welded pipe, for example, the pipe is typically subjected to pressure testing in order to determine whether the section has been properly formed and is air tight. The pipe section is mounted between end plates of two opposed test fixtures, which support the pipe and form an air tight seal at the open ends thereof. Pressurized air is then pumped into the interior of the tubing or pipe. Tests may then be conducted to determine whether any air is leaking from the pipe interior to the surrounding atmosphere.

In testing apparatus of the general type described above, it is important that the pipe be easily mounted on the test fixture and that a leak-tight seal at the junction of the pipe under testing and the test fixtures be readily formed. Further, it is of significance that the testing procedure require no mechanical attachments and that it be non-damaging to the pipe, so that fiberglass, non-ferrous and similar pipes can be accommodated, as well as steel pipes.

It is an object of the present invention to provide an improved and more effective sealing means to be mounted at the end plates of test fixtures of the type being referred to. The sealing means is adapted to be operable upon the placement of an open end of the pipe to be tested in abutting relation to the end plate, to form an efficient air-tight seal. In its broadest scope, the present invention provides a continuous yieldable, radially expandable sealing member at each end plate. Each sealing member is adapted to be expanded so as to be tightly received into the junction area between the open end of the pipe and the complimentary test fixture end plate. Novel, pneumatically expandable actuator means is associated with each sealing member and is also supported on the circular end plates of the test fixtures. The sealing member and actuator means are so arranged on the end plate that the sealing member is normally spaced from the junction area along an angular axis. When it is desired to form the air tight seal, the pneumatically inflatable actuator is actuated to expand the continuous sealing element along a conical envelope and thereby wedge the sealing member tightly into the junction area to provide the seal.

Advantageously, the continuous sealing member comprises a continuous rubber annulus of generally triangular cross section, sometimes referred to as a "delta seal" member. The delta seal member is initially expanded and advanced longitudinally to contact both the pipe inner wall and the end plate in the junction area. The delta seal member easily conforms to the configuration of the junction area whereby the seal may be easily wedged therein under test pressures acting on the "base" of the triangular cross section.

According to one aspect of the invention, the actuator means comprises a continuous annular pneumatic actuator including means to connect the actuator to the end plate and additional means to connect the actuator to the continuous delta seal member. The annular actuator, which is formed of elastomeric material, defines a hollow cavity. In its normal, unactuated condition, the elastomeric member is of a flat, oblong cross-section and supports the delta seal member in a retracted position, spaced axially from the end plate and radially contracted to a diameter less than the inside of the pipe. When the open end of a pipe to be tested is placed in abutting relation to the end plate, the actuator is inflated by fluid under pressure applied to the hollow cavity of the actuator. This will tend to expand the annular actuator member along a conical envelope whereby the delta seal member is expanded radially and also advanced longitudinally toward the end plate. The delta seal member is thus wedged into sealing position at the pipe end-test fixture junction.

When the test pressure is applied to the interior of the pipe, it will place an outwardly directed pressure on all the exposed surfaces of the test pipe, test fixture end plate and delta seal member. The outwardly facing sealing surfaces of the delta seal member intersect to form an angle of slightly greater than 90°. This will cause the end portions of these surfaces to contact the pipe interior and test fixture end plate respectively before the apex of the angle of intersection of the surfaces. The test pressure directed against the delta seal member will tend to wedge it further into the junction of pipe end and the test fixture, thereby increasing the sealing effect of the delta seal member independently of the inflatable actuator.

For a better understanding and appreciation of the above and other features and advantages of the invention, reference should be made to the following detailed description of a preferred embodiment of the invention and to the accompanying drawings.

BRIEF DESCRIPTION OF THE DRAWINGS:

FIG. 1 is a side view of a test apparatus for pipes including a partial cross-sectional view of one end thereof to illustrate features of the present invention which are incorporated therein.

FIG. 2 is a cross-sectional end view of the test apparatus and taken generally along line 2—2 of FIG. 1.

FIG. 3 is a cross-sectional view taken generally along line 3—3 of FIG. 2, of the delta seal and actuator of the invention in the retracted position and FIG. 4 is a view of the delta seal and actuator of FIG. 3 in the actuated position.

DETAILED DESCRIPTION OF A PREFERRED EMBODIMENT

Referring now to the drawings, and initially to FIG. 1, there is illustrated a testing apparatus for the pressure testing of open-ended pipe. A test pipe 10 is removably supported between two test fixtures 11, 12. The test fixture 12, at the right hand side of the test apparatus, may be fixedly mounted and includes an air passage 13 which opens on circular end plate 14. The air passage 13 is connected to a suitable source of pressurized air (not shown) for supplying test air to the interior of the pipe 10.

To facilitate the mounting of the test pipe 10, the test fixture 11, at the left, is provided with wheels 15 which ride on tracks 16. An actuating rod 17 of any conventional actuator, for example a fluid actuator operable through a predetermined stroke (not shown), is connected to the test fixture 11 by a connecting pin 18. The actuator rod 17 is initially retracted to a far-left position, and the test pipe 10 is placed between the two test fixtures 11, 12. The right hand end of the test pipe 10 is placed in a perpendicular, abutting relation to the end plate 14 of the test fixture 12. At this time, the actuator rod 17 may be moved to the right thereby moving the test fixture 11 on the tracks 16 until the circular end plate 19 is in abutting relation to the left hand end of the test pipe 10.

In accordance with the present invention, each of the end plates 14, 19 is provided with a continuous, yieldable sealing element 20 adapted to form an air tight seal between the ends of the test pipe 10 and the end plates 14, 19 respectively. The right hand end of the test apparatus of FIG. 1 is shown in cross section to illustrate the sealing means of the present invention, and the detailed description will refer to this portion of FIG. 1. However, it is to be understood that an identical sealing means arrangement is provided at the end plate 19.

In its preferred form the sealing element 20, sometimes herein referred to as a delta seal member, comprises a continuous rubber annulus of generally triangular cross-section, as best illustrated in FIG. 3. The delta seal member 20 includes two sealing surfaces 20a, 20b which are disposed at an angle slightly greater than 90° and are adapted to be wedged into the right-angular junction area between the end of the test pipe 10 and end plate 14.

A continuous, pneumatically inflatable actuator 21, formed of elastomeric material, is provided with an integral continuous key projection 22 which projects from one side of the actuator and is adapted to be received into a complimentary dove-tailed slot 23 formed in the back face of the delta seal member 20. The other side of the actuator is provided with an integral continuous T-shaped flange 24. An annular retainer 25 is formed to include an annular slot 26 with overlying flanges 27 whereby the T-shaped flange 24 of the pneumatic actuator 21 may be secured in the annular slot 26.

Pursuant to one aspect of the invention, the annular retainer 25 supports the actuator 21 and seal 20 at an angle (advantageously about 45°) to the axis of the pipe. Accordingly, when the actuator 21 is inflated, both it and the delta seal member 20 will expand along a conical envelope which substantially intersects with the annular junction between the pipe end and the plate 14. This will properly position the delta seal 20 with respect to the junction of the end of the test pipe 10 and end plate 14, as will be understood.

A plurality of perpendicular support posts 28 are secured to the end plate 14, as by welding, reflected at 29, with each being spaced a predetermined distance from the circumference of the end plate 14 to form an annular array. The annular retainer 25 has an internal diameter which is slightly greater than the diameter of the annular array of the support posts 28, whereby the retainer 28 may be received over the support posts 28 and secured thereto by welding, as reflected at 30. The annular retainer 28 is positioned so that the flanges 27 are spaced from but generally toward the end plate 14. This will place the retracted delta seal member 20 at a position spaced axially from the end plate 14 and radially from the pipe wall, but in alignment with the junction between the end plate 14 and test pipe 10, as clearly illustrated in FIGS. 1 and 3.

Referring now to FIG. 3, the rubber pneumatic actuator 21 defines a continuous hollow cavity 31. The cavity 31 has a flat, oblong cross-section when the actuator 21 is in its normal, deflated state. After the test pipe 10 has been placed between the test fixtures 11, 12 as described above, pressurized air may be applied to the cavity 31 via a passage means which may run along the path defined by the dashed line 32. Typically, the air is under a pressure of about 40 psi. The pressurized air will cause the actuator to expand, as shown in FIG. 4, thereby expanding the delta seal member 20 along a conical envelope toward the pipe end plate junction. This will cause the sealing surfaces 20a, 20b of the delta seal 20 to be wedged into the junction area between the test pipe 10 and end plate 14 to form an air tight sealing relationship.

To particular advantage, the sealing faces 20a, 20b intersect at an angle slightly greater than 90°. Thus, the end portions 33 of the sealing faces 20a, 20b will contact the test pipe 10, and end plate 14 before the apex of the angle of inter section of the sealing surfaces 20a, 20b. As reflected in FIG. 4, this will cause the back face of the delta seal 20 to be slightly deformed into a curved surface whereby the sealing surfaces 20a, 20b will be pressed against the pipe 10 and end face 14 to insure a tight seal.

After the test pipe 10 is initially sealed to the end plates 14, 19 by inflation of the actuator, pressurized air may be fed to the interior of the pipe through air passage 13 for testing purposes. Typically, the test air pressure is at least 100 psi. This pressure, being greater than the inflation pressure of the actuator, will tend to collapse the expanded cavity 31, however, the test air pressure will also be directed against the back face of the delta seal member 20, urging it against the pipe and plate surfaces to increase the sealing action thereof.

The present invention provides a straight forward, extremely effective sealing means for large diameter pipe testing apparatus. When the actuator 21 is in its normal unactuated state, the delta seal element 20 will be spaced from the junction area of the test pipe 10 and end plate 14. Thus, the test pipe 10 may be easily and quickly positioned against the end plate for mounting. To form the air-tight seal, pressurized air is simply applied to the cavity 31 of the rubber actuator 21 to expand the actuator 21 along a conical envelope and thereby wedge the delta seal member 20 in the sealing position.

The novel arrangement of annular retainer 25, actuator 21 and delta seal member 20 advantageously positions the delta seal in an initial retracted position, spaced from the junction area. This facilitates an unobstructed test pipe 10 mounting procedure, thereby simplifying and expediting the overall test procedure.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. In an apparatus for pressure testing open-ended pipes of the like, means to provide a sealing relation between an open end of said pipe and an end plate of a pipe supporting test fixture, which comprises
   a. a continuous annular, yieldable delta seal member,
   b. annular, expandable actuator means associated with and supporting said delta seal member,
   c. mounting means for supporting said actuator means and said continuous delta sealing member on said end plate,
   d. said support means being so configured and arranged as to position said delta seal member means spaced from the junction between said open-ended pipe and said end plate, and e. said actuator means being operative to expand said delta seal member along a conical envelope toward said junction, whereby the delta sealing member is wedged into said junction to provide a sealed relationship between said open-ended pipe and said end plate.

2. The sealing means of claim 1, further characterized by
   a. said actuator comprising a continuous, pneumatically inflatable actuator including an internal cavity of flat oblong cross-section, and
   b. a source of pressurized air including an air passage means connecting said source to said cavity whereby the application of pressurized air to said cavity will expand said actuator thereby expanding said delta seal member to wedge said sealing member into said junction.

3. The sealing means of claim 1, further characterized by
   a. said continuous, yieldable delta seal member comprising a continuous elastomeric annulus of generally triangular cross section.

4. The sealing means of claim 2, further characterized by
   a. said mounting means comprising an annular retainer means mounted on said end plate,
   b. said delta seal member and said pneumatically inflatable actuator being supported on said annular retainer, and
   c. said retainer means, actuator and delta seal member being so arranged and configured as to initially position said delta seal member spaced from and facing opposite the junction, whereby upon actuation of said pneumatically inflatable actuator, said delta seal member will be wedged into the junction.

5. In an apparatus for pressure testing open-ended pipes or the like, means to provide a sealing relation between an open end of said pipe and an end plate of a pipe supporting test fixture, which comprises
   a. a continuous, annular pneumatic actuator defining a hollow cavity of oblong cross-section,
   b. means to mount said pneumatic actuator on said end plate,
   c. an annular sealing member associated with said pneumatic actuator and adapted to be tightly received into the junction area between the open end of said pipe and said end plate to form an air-tight seal,
   d. said sealing member being normally spaced from said junction area,
   e. a source of pressurized air connected to said cavity whereby the application of pressurized air to said cavity will cause the cavity to expand thereby causing said pneumatic actuator to expand said sealing member to be tightly received into said junction area.

6. The sealing means of claim 5, further characterized by
   a. said sealing member comprising a continuous, elastomeric annulus of generally triangular cross-section,
   b. a continuous slot being formed in one surface of said sealing member,
   c. said pneumatically inflatable actuator including a continuous integral projection adapted to be received and secured within said slot,
   d. the remaining two surfaces of said sealing member forming sealing surfaces and being adapted to be wedged into the junction,
   e. whereby when said cavity is expanded, said sealing member will be expanded and wedged into said junction.

7. The sealing means of claim 6, further characterized by
   a. said sealing surfaces intersecting at an angle slightly greater than 90°.

* * * * *